(12) United States Patent
Wright et al.

(10) Patent No.: US 12,265,604 B2
(45) Date of Patent: Apr. 1, 2025

(54) ELECTRONICALLY SECURED PACKAGE DELIVERY

(71) Applicant: GM GLOBAL TECHNOLOGY OPERATIONS LLC, Detroit, MI (US)

(72) Inventors: Adam L. Wright, Livonia, MI (US); Russell A. Patenaude, Macomb Township, MI (US); Matthew E. Gilbert-Eyres, Rochester Hills, MI (US); Eric T. Hosey, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 18/180,207

(22) Filed: Mar. 8, 2023

(65) Prior Publication Data

US 2024/0303318 A1 Sep. 12, 2024

(51) Int. Cl.
*G06F 21/44* (2013.01)
*G06Q 10/083* (2023.01)

(52) U.S. Cl.
CPC .......... *G06F 21/445* (2013.01); *G06Q 10/083* (2013.01)

(58) Field of Classification Search
CPC .... G06F 21/445; G06Q 10/083; G06Q 50/40; G06Q 50/60
See application file for complete search history.

(56) References Cited

U.S. PATENT DOCUMENTS

| | | | |
|---|---|---|---|
| 11,068,838 B1* | 7/2021 | Cougar | G06Q 10/0832 |
| 2018/0137454 A1* | 5/2018 | Kulkarni | G05D 1/021 |
| 2018/0144298 A1* | 5/2018 | Rankin | H04L 9/3247 |
| 2018/0198779 A1* | 7/2018 | Canavor | H04W 12/069 |
| 2018/0205682 A1* | 7/2018 | O'Brien, V | H04L 51/10 |
| 2019/0180237 A1* | 6/2019 | Mattingly | G06Q 10/08355 |
| 2020/0333804 A1 | 10/2020 | Toner et al. | |

FOREIGN PATENT DOCUMENTS

JP 2021-33447 * 3/2021 ........... G05D 1/0016

OTHER PUBLICATIONS

Zini, Aldo, "Robots expand delivery options with seamless integration: a growing number of forward-thinking hospitals in search of greater efficiencies are embracing automated delivery robots," Health Management Technology, 32.3: 10(3), NP Communications, LLC, Mar. 2011.*

* cited by examiner

*Primary Examiner* — Nathan Erb
(74) *Attorney, Agent, or Firm* — Quinn IP Law (57) ABSTRACT

Securing package delivery via unmanned aerial vehicles (UAVs), drones, robots, etc. is contemplated. The package delivery may include assigning a provenance certificate to a package scheduled for drone delivery, determining a plurality of vehicles to be used in transporting the package to an autonomous receiver, determining credentials assigned to each of the vehicles, pairing the credentials with the package to generate a delivery pairing, the delivery pairing identifying the credentials of the vehicles authorized to transport the package, and transporting the delivery pairing to each of the vehicles to prevent vehicles having certificates omitted from the delivery pairing from transporting the package.

12 Claims, 3 Drawing Sheets

ELECTRONICALLY SECURED PACKAGE DELIVERY

INTRODUCTION

The present disclosure relates to securing package delivery, such as but not necessarily limited to electronically securing package delivery when transported using autonomous vehicles, unmanned aerial vehicles (UAVs), drones, quadcopters, robots, etc.

A package may experience a plurality of handoffs between delivery vehicles when traveling along a delivery route. As more and more delivery routes begin to rely upon autonomous types of delivery vehicles, such as unmanned aerial vehicles (UAVs), drones, quadcopters, robots, etc., an ability to electronically secure handoff of the package from one delivery vehicle to another may be valuable, both in terms of tracking the movement of the package and in thwarting unauthorized vehicles or individuals from interfering with the package delivery. Prior processes have attempted to secure package delivery by physically affixing barcodes, radio frequency (RF) tags, labels, and other features directly to the package. The reliance on such security features to be affixed to the package may be problematic as the use thereof may be dependent on exposing the package, which may result in unauthorized vehicles and/or individuals taking the package without permission.

SUMMARY

One non-limiting aspect of the present disclosure relates to electronically securing package delivery by generating a delivery pairing. The delivery paring may be used to electronically relate a plurality of credentials with a plurality of delivery vehicles authorized for use in transporting the package along a delivery route, such as during a last mile or other portion of the delivery route where packages may be exchanged between autonomous delivery vehicles. Delivery pairing may also be used to electronically relate a plurality of credentials with a plurality of building(s) or personal digital device authentication or access. The credentials may be provided to the delivery vehicles, with the delivery vehicles being controlled to prevent exposing or otherwise sharing the package with other delivery vehicles unless those delivery vehicles are also in possession of one of the credentials. The credentials may also be provided to secure locations (lock box, building door, secure bay, vehicle compartment, etc.). The package delivery may be controlled to prevent exposing or otherwise sharing the package with other delivery vehicles unless those delivery vehicles are also in possession of one of the credentials. The package delivery may optionally be additionally secured with a provenance certificate. The provenance certificate may be signed during each package handoff to generate a unique chain of custody as the package travels along the delivery route.

One non-limiting aspect of the present disclosure relates to a method for electronically securing unmanned aerial vehicle (UAV) package delivery. The method may include determining a provenance certificate assigned to a package scheduled for UAV package delivery and determining a delivery route for the package. The route may include a beginning at a pick-up location and ending at a drop-off location. The method may further include determining a plurality of vehicles to be used in transporting the package along the delivery route, determining credentials assigned to each of the vehicles and the drop-off location, and pairing the credentials with the package to generate a delivery pairing. The delivery pairing may identify the credentials of the vehicles authorized to transport the package and the drop-off location authorized to accept delivery of the package. The method may further include authorizing a first vehicle to receive the provenance certificate and the package and authorizing a first autonomous handoff of the package from the first vehicle to a second vehicle in response to the first vehicle identifying the second vehicle to be within the delivery pairing.

The method may include performing a first provenance process as part of the first autonomous handoff. The first provenance process may include the first vehicle digitally signing the provenance certificate with a first key of the first vehicle to generate a first certificate and transmitting the first certificate to the second vehicle.

The method may include authorizing a second autonomous handoff of the package from the second vehicle to an autonomous receiver at the drop-off location in response to the second vehicle identifying the autonomous receiver to be within the delivery pairing.

The method may include performing a second provenance process as part of the second autonomous handoff. The second provenance process may include the second vehicle digitally signing the first certificate with a second key of the second vehicle to generate a second certificate and transmitting the second certificate to the autonomous receiver.

The method may include performing a notification process following receipt of the package at the autonomous receiver. The notification process may include a back-office delivery controller receiving a delivery message from the autonomous receiver. The delivery message may include the second certificate and a timestamp marking receipt of the package at the autonomous receiver.

The notification process includes the back-office delivery controller transmitting a notification message to a device associated with an originator of the package, the notification message including information indicating successful delivery of the package to the autonomous receiver.

The method may include performing a localization process as part of the first autonomous handoff. The localization process may include the first vehicle and the second vehicle bidirectionally exchanging positioning signals to guide the second vehicle in autonomously retrieving the package from a package pick-up bay of the first vehicle.

The localization process may include the first and second vehicles exchanging ultra-wideband (UWB) location pulses between anchors included thereon, with the second vehicle localizing to the package pick-up bay based at least in part on a time-of-flight (TOF) associated with the pulses.

The method may include performing a prioritization process prior to authorizing the second autonomous handoff, the prioritization process including the first vehicle selecting the second vehicle from a plurality of UAVs operating in proximity thereto.

The prioritization process may include discovering credentials wirelessly transmitted to the first vehicle from the UAVs and selecting the second vehicle from one or more of the UAVs transmitting a credential to the first vehicle matching with one of the credentials in the delivery pairing.

The prioritization process may include selecting a third vehicle from one or more of the UAVs transmitting a credential to the first vehicle matching with another delivery pairing associated with another package included within another package pick-up bay of the first vehicle and coordinating a flight of the third vehicle to the another package pick-up bay relative to a flight of the second vehicle to the package pick-up bay to avoid the second and third vehicles interfering with each other when retrieving the package and the another package from the first vehicle.

The method may include performing a security process in response to a fourth vehicle attempting to retrieve the package from the first vehicle, the fourth vehicle lacking a credential matching with one of the credentials in the delivery pairing.

One non-limiting aspect of the present disclosure relates to method for electronically securing drone package delivery. The method may include determining a provenance certificate assigned to a package scheduled for drone delivery, determining a delivery route for the package and determining a plurality of vehicles to be used in transporting the package along the delivery route, optionally with at least one of the vehicles being a surface vehicle configured for surface transport of the package and at least one of the vehicles being a drone configured for aerial transporting the package a last mile to an autonomous receiver at a drop-off location. The method may further include determining credentials assigned to each of the vehicles and the autonomous receiver, pairing the credentials with the package to generate a delivery pairing, the delivery pairing identifying the credentials of the vehicles authorized to transport the package and the autonomous receiver authorized to receive the package, and authorizing a surface-to-air autonomous handoff of the package from the surface vehicle to the drone in response to the surface vehicle identifying the drone to be within the delivery pairing. The drone may be operable thereafter for autonomously flying the package to the drop-off location.

The method may include authorizing an air-to-surface autonomous handoff of the package from the drone to the autonomous receiver in response to the drone identifying the autonomous receiver to be within the delivery pairing.

The method may include performing a provenance process as part of the surface-to-air autonomous handoff and the air-to-surface autonomous handoff. The provenance process may include the surface vehicle signing the provenance certificate for transmission to the drone and the drone thereafter signing the provenance certificate for transmission to the autonomous receiver.

The method may include performing a localization process as part of the surface-to-air autonomous handoff and the air-to-surface autonomous handoff. The localization process may include the surface vehicle and the drone bidirectionally exchanging positioning signals to guide the drone in autonomously retrieving the package from a package pick-up bay of the surface vehicle and the drone and the autonomous receiver bidirectionally exchanging positioning signals to guide the drone in autonomously delivering the package to a package drop-off bay of the autonomous receiver. The positioning signals may be ultra-wideband (UWB) location pulses emitted to measure time-of-flight (TOF) between anchors included on the surface vehicle, the drone, and the autonomous receiver.

The method may include the surface vehicle receiving certificates from a plurality of drones operating in proximity thereto and selecting the drone from a one of the plurality of drones transmitting a credential to the surface vehicle matching with one of the credentials in the delivery pairing.

The method may include the surface vehicle denying delivery of the package to one or more of the drones providing credentials failing to match with one of the credentials in the delivery pairing.

One non-limiting aspect of the present disclosure relates to controller configured for electronically securing package delivery. The controller may include a computer-readable storage medium having a plurality of non-transitory instructions stored thereon. The non-transitory instruction, when executed with a processor of the controller, may be operable for assigning a provenance certificate to a package scheduled for drone delivery, determining a plurality of vehicles to be used in transporting the package to an autonomous receiver, determining credentials assigned to each of the vehicles, pairing the credentials with the package to generate a delivery pairing, with the delivery pairing identifying the credentials of the vehicles authorized to transport the package, and transporting the delivery pairing to each of vehicles to prevent vehicles having certificates omitted from the delivery pairing from transporting the package.

With at least one of the vehicles being a surface vehicle and at least one of the vehicles being a drone configured for transporting the package a last mile, the non-transitory instructions may be operable for authorizing a surface-to-air autonomous handoff of the package from the surface vehicle to the drone in response to the surface vehicle identifying the drone to be within the delivery pairing, with the drone operable thereafter for autonomously flying the package to a drop-off location, and authorizing an air-to-surface autonomous handoff of the package from the drone to an autonomous receiver at the drop-off location in response to the drone identifying the autonomous receiver to be within the delivery pairing.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
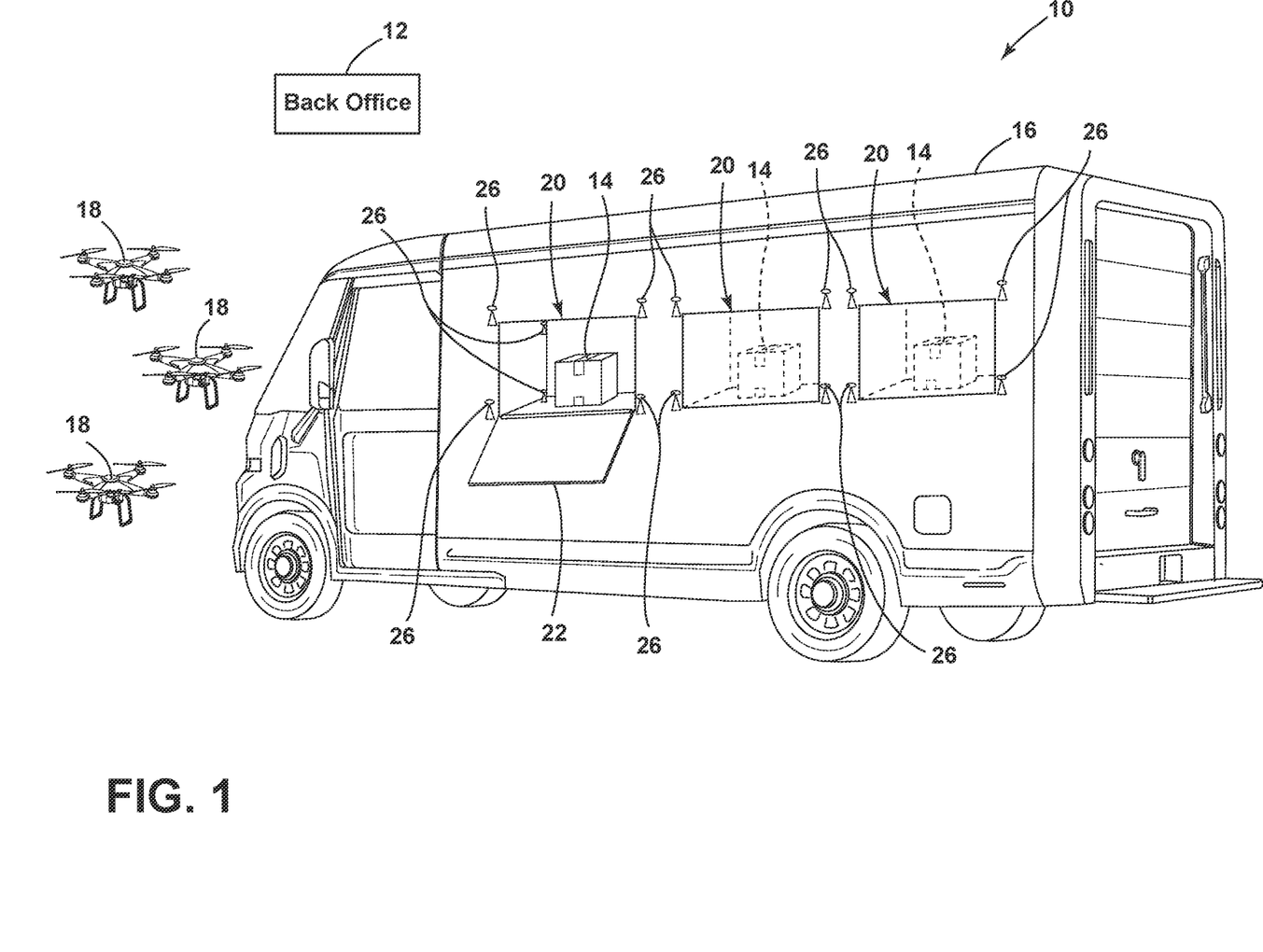
FIG. 1 illustrates a diagram of an electronically secured package delivery system in accordance with one non-limiting aspect of the present disclosure.

FIG. 1 illustrates a diagram of an electronically secured package delivery system 10 in accordance with one non-limiting aspect of the present disclosure. The system 10 may include a back office controller 12 or other entity configured for coordinating the delivery activities described herein. The controller 12 may be configured to electronically secure delivery of a package 14 from one location to another, such as to provide end-to-end electronic protection for securing the package 14 from a pick-up location to a drop-off location. The pick-up location may correspond with a beginning location where an item may be enclosed within the package 14 for delivery, such as at a manufacturing location, a distribution hub, an individual's home, etc. The drop-off location may correspond with an ending location or final destination for delivery of the package 14, such as a doorstop, a loading dock, a building or dwelling, an autonomous receiver, etc. The system 10 may be beneficial in electronically securing the package 14 while transitioning between various delivery vehicles 16, 18 used along a delivery route, such as during a last mile or other portion of the delivery route where packages 14 may be autonomously handed off between autonomously operated delivery vehicles 16, 18.

FIG. 1 illustrates an exemplary scenario where an individual or an autonomous device has placed a package 14 within one of a plurality of package delivery bays 20 of a surface vehicle 16, 18. Additional packages 14 may be similarly placed within the other package delivery bays 20. The surface vehicle 16 may be operated by a human driver and/or by an autonomous operating system 10 to facilitate ground transportation of the package 14 along a portion of the delivery route. One non-limiting aspect of the present disclosure contemplates the package 14 being placed upon the surface vehicle 16 at a distribution hub or sorting center whereafter the surface vehicle 16 may thereafter be driven to another location whereat one or more autonomous vehicles 18 may be operating to facilitate last mile delivery to the drop-off location. The autonomous vehicles 18 are illustrated for non-limiting purposes as being unmanned aerial vehicles (UAVs), which may be colloquially referred to as drones, as the present disclosure fully contemplates use of other autonomous types of vehicles, such as robots, quadcopters, self-driving or self-operating devices, conveyor systems, non-aerial devices, etc.

The UAVs 18 may be operable in the manner described herein to facilitate autonomously retrieving the packages 14 from the package delivery bays 20. The package delivery bays 20 may correspondingly include access doors 22 that may be autonomously opened by the UAVs 18, such as through wireless signaling. The UAVs 18 may be configured to bidirectionally exchange wireless signals with the surface vehicle 16, 18 and/or a plurality of anchors 26 included thereon as part of a localization process.

The localization process may be beneficial in guiding the UAVs 18 to pick up a corresponding one or more of the packages 14. The surface vehicle 16, 18, the UAVs 18, or other autonomous delivery vehicles 16, 18 operable in accordance with the present disclosure for facilitating delivery of the packages 14, may include various controllers, operating systems, antennas, communication mechanisms, etc. The wireless signals exchange therebetween, for example, may occur via corresponding interfaces having capabilities operable to support communicating wireless signals associated with Bluetooth, Wi-Fi, Ultra-Wideband (UWB—IEEE 802.15.14), and like. The delivery vehicles 16, 18 may include a computer-readable storage medium having a plurality of non-transitory instructions stored thereon, which when executed with an associated processor, may be operable to facilitate the operations and processes contemplated herein.

Figure 2:
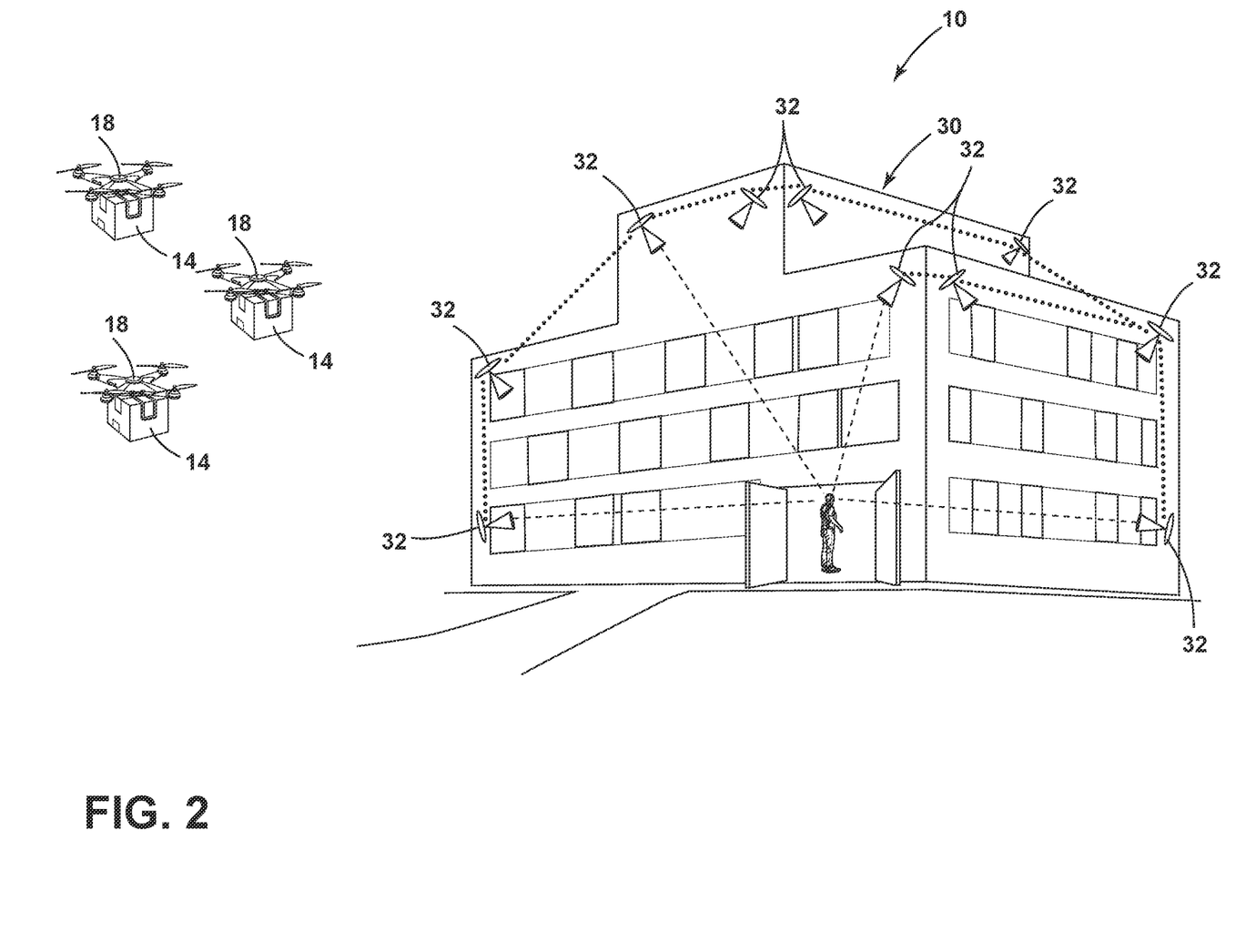
FIG. 2 illustrates a diagram of a UAVs aerially transporting packages to an office building in accordance with one non-limiting aspect of the present disclosure.

FIG. 2 illustrates a diagram of the UAVs 18 aerially transporting the packages 14 to the drop-off location, which is shown for non-limiting purposes to correspond with an office building 30. The UAVs 18 may be configured to autonomously open a door or other entry to the building 30 and thereafter separately transport the packages 14 to an individual, such as by triangulating to a location of a mobile phone carried by the individual, and/or to other locations within the building. The UAVs 18 may transport the packages 14 to autonomous receivers, bays, lockers, etc. capable of being autonomously opened and closed by the UAVs 18 to secure package 14 delivery within the building 30. For the sake of simplicity, the vehicles 16, 18, individuals, devices, receivers, etc. used to facilitate transport, handoff, storage, receipt, etc. for the packages 14 may be collectively and generically referred to as delivery vehicles 16, 18. The office building 30 may include a plurality of anchors 32 operable to facilitate exchanging wireless signals with the UAVs 18 to facilitate the localization process and guiding of the UAVs 18 therethrough. Drones may improve indoor anchor localize to drop off location through fusion of other onboard technologies such as sensors, GPS, high definition maps, etc. The drop off of the packages 14 from the UAVs 18 to destinations within the building 30, i.e., the drop-off location associated therewith, may occur in a manner similar to the handoff with the surface vehicle 16, 18.

The present disclosure contemplates the controller 12 being configured to facilitate electronically securing the packages 14 across an entirety of the delivery route by utilizing credentials to individually authorize each package 14 handoff between the autonomous delivery vehicles 16, 18. The package 14 delivery may be additionally secured with a provenance certificate that may be signed by each of the autonomous delivery vehicles 16, 18 to generate a chain of custody. The provenance credential may be reported at each handoff, such as following signing by the conveying-one of the delivery vehicles 16, 18. Each of the vehicles 16, 18 may be assigned a unique key to be used in signing the provenance credential such that at the end of the delivery route the provenance credential has a separate signature from each of the delivery vehicles 16, 18. The signatures may optionally be timestamped and/or include additional information to indicate circumstances surrounding the corresponding handoff, e.g., the time of the handoff, the vehicles 16, 18 involved, the location, etc. The delivery vehicles 16, 18 may optionally be required or requested to relay the provenance credential to the controller 12 following each handoff. The controller 12 may use the corresponding provenance information to keep track of the delivery process, and if desirable, to generate an alert should an unauthorized delivery vehicle 16, 18 attempt to retrieve the package 14, an alert if the delivery is behind schedule, and/or notification to confirm final delivery. The controller 12, for example, may maintain the provenance information for longer-term storage.

Figure 3:
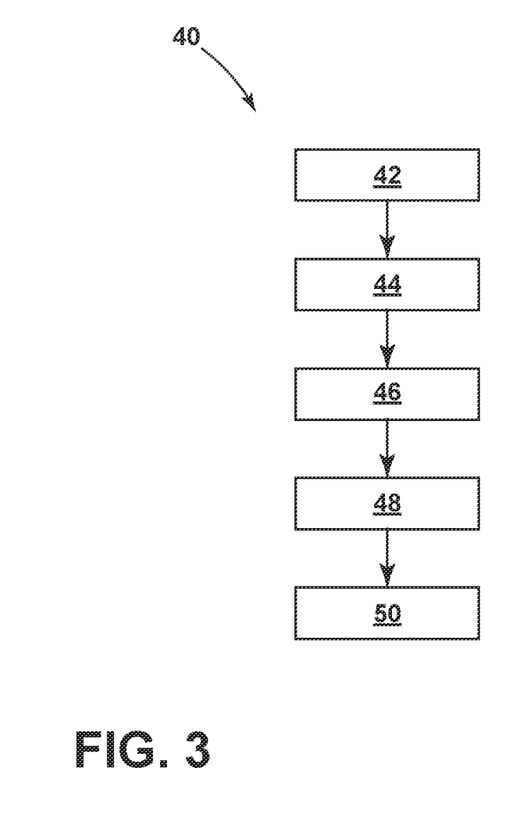
FIG. 3 illustrates a flowchart of a method for electronically securing package delivery in accordance with one non-limiting aspect of the present disclosure.

FIG. 3 illustrates a flowchart 40 of a method for electronically securing package 14 delivery in accordance with one non-limiting aspect of the present disclosure. Block 42 relates to a provenance process whereby a provenance certificate may be generated and assigned to a package 14 scheduled for delivery. The controller 12, for example, may perform the provenance process in response to a customer requesting to deliver a package 14, an operator at a delivery hub requesting to transport package 14, etc. The provenance certificate may be an electronic construct capable of being electronically generated by the controller 12 and relayed with the package 14 from one delivery vehicle 16, 18 to another. The provenance certificate may be signed, manipulated, or otherwise processed by the delivery vehicles 16, 18 during handoff and at the pick-up and drop off locations. The provenance certificate may be repeatedly signed to generate a provenance, a blockchain, or other sequence of information for the package 14 while being handed off from one delivery vehicle 16, 18 to another.

Block 44 relates to a routing process for determining a delivery route for the package 14. The controller 12, for example, may perform the routing process to generate an identification of the delivery vehicles 16, 18, receiving devices, etc. to be used in facilitating transport of the package 14 from the pick-up location to the drop-off location. The delivery route may include a surface-to-air handoff, such as that described above with respect to FIG. 1, an air-to-surface handoff, such as that described above with respect to FIG. 2, and/or a number of additional handoffs between other delivery vehicles 16, 18. The routing process may additionally include determining scheduling, handoff times, and/or other parameters associated with the delivery route, such as intervals suitable marking times when handoff should occur, a sequence for the handoffs, and/or other information that may be tracked during transport to monitor package 14 delivery.

Block 46 relates to a credentials process for determining one or more credentials to be used in electronically securing delivery of the package 14. The controller 12, for example, may perform the credentials process so that each of the delivery vehicles 16, 18, the autonomous receiver at the drop-off location, or other devices to be used in delivering the package 14 may be assigned or otherwise associated with one of the credentials. The credentials may be electronic constructs capable of being electronically shared, such as through wireless signals originating from the controller 12 and/or between the delivery vehicles 16, 18. The credentials may be uniquely associated with the package 14 such that multiple credentials may be provided to the delivery vehicles 16, 18 to facilitate transport of different packages 14, i.e., the credentials may be assigned on a package 14-by-package 14 basis such that each delivery vehicle 16, 18 or device associated with the transport of a particular package 14 may be required to be in possession of one of the credentials associated therewith in order to obtain the package 14.

Block 48 relates to a pairing process for generating a delivery pairing by pairing the delivery vehicles 16, 18 with the credentials. The controller 12, for example, may perform the pairing process such that the delivery pairing identifies the credentials of the vehicles 16, 18 authorized to transport the packet between the pick-up and drop-off locations. The delivery pairing may optionally arrange the credentials in a sequential or organized manner such that use of the credentials may be limited to particular sequence of delivery vehicles 16, 18, time of day, etc. The credentials may be used in this manner, for example, to prevent delivery vehicles 16, 18 from skipping ahead or otherwise bypassing other vehicles 16, 18. A delivery pairing may be generated separately for each of the packages 14 to be delivered such that the controller 12 may be tasked with keeping track of a number of delivery pairings when securing transport of multiple packages 14. The delivery pairings may be used in this manner to provide a listing of vehicles 16, 18, devices, individuals, etc. authorized to facilitate transport of the package 14 based on a credential assigned thereto. The use of credentials to facilitate to pairing between delivery vehicles 16, 18 authorized to transport a particular package 14 may optionally be facilitated with UWB pairing or other techniques suitable for the delivery vehicles 16, 18 to exchange the credentials or otherwise authorize themselves to each other and the package 14 to be delivered.

Block 50 relates to a delivery process whereby the package 14 may be electronically secured while being handed off from delivery vehicle 16, 18 to another during transport from a pickup location to a drop-off location. The delivery process may correspond with the controller 12 instructing or otherwise commanding the delivery vehicles 16, 18 to secure each handoff, i.e., to secure each transition of the package 14 from one delivery vehicle 16, 18 to another delivery vehicle 16, 18 in accordance with the processes described herein. Each of the handoffs may be performed in a similar manner with respect to electronically securing transport of the package 14, generating provenance and/or tracking information, notifying a sender, a receiver, or another individual associated with transport of the package 14, etc. The foregoing describes handoffs occurring while transporting the package 14, however, as one skilled may appreciate, the processes described herein may be repeated across a wide variety of handoffs. The present disclosure, accordingly, contemplates securing package 14 delivery over vast distances, between multiple delivery vehicles 16, 18, and/or more simply via a singular delivery vehicle 16, 18 to a drop-off location.

Figure 4:
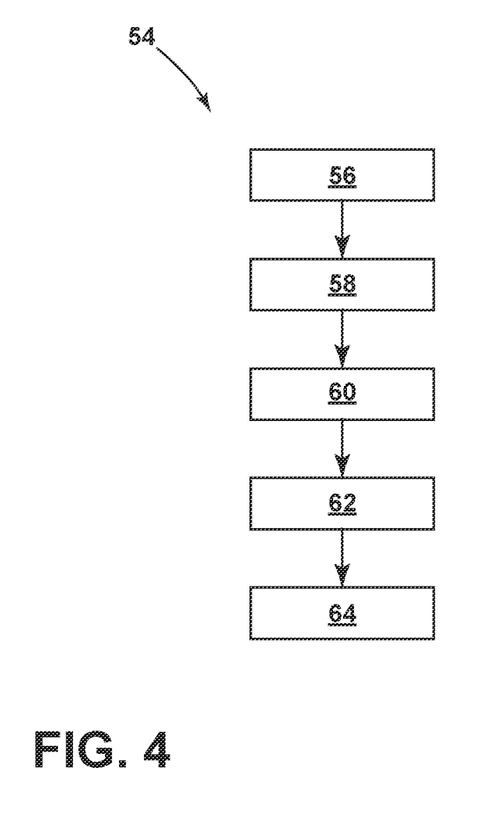
FIG. 4 illustrates a flowchart of a method for electronically securing delivery handoffs in accordance with one non-limiting aspect of the present disclosure.

FIG. 4 illustrates a flowchart 54 of a method for electronically securing delivery handoffs in accordance with one non-limiting aspect of the present disclosure. The delivery handoffs may correspond with a package 14 transitioning between delivery vehicles 16, 18 while being delivered from one location to another. The quantity of delivery handoffs may be proportional to the quantities of delivery vehicles 16, 18 employed, i.e., a handoff may occur each time the package 14 is transitioning from one vehicle 16, 18 to another or from one delivery vehicle 16, 18 to a drop-off location or individual.

Block 56 relates to an authorization process. The authorization process may correspond with the delivery vehicles 16, 18 associated with a particular handoff exchanging credentials, and based thereon, determining whether the delivery vehicle 16, 18 requesting the package 14 from the providing vehicle 16, 18 is authorized to retrieve the package 14 therefrom. The authorization may be attained by the delivery vehicle 16, 18 providing the package 14 verifying a credential provided from the delivery vehicle 16, 18 requesting the package 14. This authentication may occur at the delivery vehicle 16, 18, such as by the delivery vehicle 16, 18 comparing the received credentials to those included within the device pairing, or optionally by the delivery device relaying the received credential to the controller 12. The delivery vehicles 16, 18 may utilize one or more of the above-described signaling protocols to facilitate exchanging the credentials with each other and/or the controller 12.

Block 58 relates to a prioritization process. The prioritization process may be used in the event multiple delivery vehicles 16, 18 may be attempting to contemporaneously retrieve a package 14 from the same or neighboring delivery vehicles 16, 18. As shown in FIG. 1, for example, multiple UAVs 18 may be attempting to recover different packages 14 from the surface vehicle 16, 18. The prioritization process may be used to coordinate movements of the UAVs 18 so that they may avoid interfering with each other while retrieving one of the packages 14. The prioritization process may optionally occur in concert with the authorization process, such as by prioritizing the UAVs 18 depending on the credentials associated therewith and/or the package 14 to be picked up thereby. The credentials, for example, may identify a precedent for retrieval such that packages 14 associated with a higher priority may be prioritized for pickup over packages 14 having lower priority. Additionally or alternatively, the credentials for a particular package 14 may be in possession of multiple UAVs 18, which, for example, may occur in the event a fleet of UAVs 18 are continuously operating in a particular location to deliver packages 14. The prioritization process may include prioritizing or sorting the available UAVs 18 in possession of a valid or authenticated credential to pick up each of the packages 14.

Block 60 relates to a localization process. The localization process may correspond with the delivery vehicles 16, 18 bidirectionally exchanging wireless signals to facilitate guiding the delivery vehicles 16, 18 to a location on the other delivery vehicle 16, 18 having the package 14. The localization process, for example, may utilize UWB signaling whereby pulses may be exchanged between anchors on the delivery vehicles 16, 18 to facilitate guiding package 14 retrieval. The UWB signaling may be transmitted based on a time-of-flight (TOF) process whereby the time taken for the pulses to travel from one anchor to another may be utilized to guide the delivery vehicles 16, 18. As shown in FIG. 1, for example, the localization process may include one of the UAVs 18 exchanging signals with anchors excluded on an exterior of the surface vehicle 16, 18 in order to orientate itself relative to the bay door and thereafter with anchors positioned within an interior of the package 14 pick-up bay to more accurately align itself with the package 14 being retrieved.

The localization process may optionally include other methodologies for orientating or guiding the delivery vehicles 16, 18 with respect to the package 14, such as by utilizing a fusion with other assistive methods. This may be accomplished by additionally guiding movements according to the UWB signaling and supplements provided with a global positioning system 10 (GPS), cameras, a point cloud, or other features available on delivery vehicles 16, 18. While the localization process is predominantly described with respect to guiding the UAVs 18 relative to the package 14 delivery bays of the surface vehicle 16, 18, the localization process may be relatedly performed relative to other delivery vehicles 16, 18. In the case of the package 14 being delivered to the building illustrated in FIG. 2, for example, the localization process may include a delivering UAV 18 or other robotic device similarly exchanging wireless signals with anchors included within the building for guidance. The signals may be exchanged in this manner to facilitate navigating the delivery vehicle 16, 18 through hallways, court orders, offices, etc. within the building, optionally including use of the signals to facilitate delivering the package 14 directly to an individual, placing the package 14 in autonomous receiver or bay, dropping the package 14 on a desk, etc.

Block 62 relates to a provenance update process. The provenance update process may correspond with the delivery vehicle 16, 18 in possession of the package 14 signing the provenance certificate associated therewith when facilitating transport of the package 14 to the receiving, delivery vehicle 16, 18. The signing of the provenance certificate may occur at each handoff such that the provenance update process may occur when each of the delivery vehicles 16, 18 transfer the package 14 to another delivery vehicle 16, 18.

Block 64 relates to a notification process. The notification process may include the delivery vehicle 16, 18 relaying or receiving the package 14 transmitting a notification message to the controller 12 apprising the controller 12 of the corresponding handoff. The notification message may include the newly signed provenance certificate and/or additional information associated with the corresponding handoff, e.g., a timestamp associated therewith. The notification process may include the controller 12 transmitting a related notification message to a sender and/or a recipient of the package 14, e.g., a person originating the package delivery and a person accepting the package delivery, to apprise as to movements of the package 14. The notification message may be beneficial in the event the package 14 is delivered to an autonomous receiver to apprise the individual associated therewith that the package 14 has been delivered. The notification message and/or other alerts generated during package transport may be kept at the controller 12 for subsequent usage, such as for long term tracking and verification of the chain of custody.

As supported above, the present disclosure relates to enabling encrypted security access for drones to safely/ securely enter delivery vehicles and help precisely localize the drone to a vehicle/building access without the need for additional perception processing. This would include the use of BLE and UWB technologies enabled in the delivery vehicle, drones, and buildings to allow delivery vehicle(s) to park at a centralized location and allow multiple drones to securely access ports in the vehicle to retrieve a package. The disclosed process may be used to allow drones secure access to buildings and to locate individuals within. A secure connection being used to allow the package to be digitally signed by users mobile device and securely released to them. Adding UWB and BLE to the drone and syncing with vehicle/building system may allow quick secure access to various doors within the hub for package retrieval and delivery. UWB technology may allow the drone to gain access to an automated door within 13 cm (avoid collision) without the need for heavy power and time-consuming perception. Utilizing connected sensor fusion between delivery drone, vehicle, and building for package sorting, prepping, and collection may assure the correct package makes it to the right person. The use of BLE, UWB or similar technology may allow drones to localize and deliver to the correct person (provided mobile device is on the person) and have a securely encrypted connection which may enable digital package "signing" without pause.

This present disclose includes a method to add a secure element to last mile delivery drones which may be helpful in thwarting unauthorized users from stealing packages and enable secure handoff between distribution/delivery vehicles. The system may allow for credential authentication so that access doors in the vehicle which contain the package may control lock actuators to be disabled after the credential authentication, giving the drone access to the package. In addition to security credentials, the system may also enable the drone to gather information useful to generate localization and navigation, both in the vehicle and in buildings utilizing similar sensors and connectivity. This may improve the drone flight accuracy and supplement perception to avoid collision with its surroundings. Once the drone has the required access to the package, a package authentication system may be used to further secure package delivery. A set of parameters may be added in line to check the package is correct before the drone grabs it, which may include barcodes, weight confirmation, pattern recognition, or others. This may be useful in providing security at each step of package handoff, but also to allow for checks at every step of handoff.

Once the drone has the package, it can head to the drop-off location. With the credential authentication being added to the delivery vehicles, the drone can now have secure access to secure buildings or private homes, etc. This authentication key handling may be done in the drone system process and be managed by several external back office interfaces through a secure link. This security may be offered to a customer who wants to use their own drones or would like any third-party drone to have a security pass to gain entrance to the facility. Inside the delivery building, the drone may utilize customer data to find the drop-off location and utilize secure package digital signing to ensure the correct person receives the package and can be confirmed. The drones may be configured for use in a number of environments and within a mobile application that may be utilized to authorize a flawless handover of package in every step of the process. The drone may optionally be configured to support pattern recognition, biometric recognition, barcode drop off, digital key entrance to secure boxes, etc.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for electronically securing unmanned aerial vehicle (UAV) package delivery, comprising:
   determining a provenance certificate assigned to a package scheduled for UAV package delivery;
   determining a delivery route for the package, the route beginning at a pick-up location and ending at a drop-off location;
   determining a plurality of vehicles to be used in transporting the package along the delivery route;
   determining credentials assigned to each of the vehicles and the drop-off location;
   pairing the credentials with the package to generate a delivery pairing, the delivery pairing identifying the credentials of the vehicles authorized to transport the package and the drop-off location authorized to accept delivery of the package;
   authorizing a first vehicle to receive the provenance certificate and the package, the first vehicle being present at the pick-up location to begin transporting the package for delivery;
   authorizing a first autonomous handoff of the package from the first vehicle to a second vehicle in response to the first vehicle identifying the second vehicle to be within the delivery pairing;
   performing a first provenance process as part of the first autonomous handoff, the first provenance process including: the first vehicle digitally signing the provenance certificate with a first key of the first vehicle to generate a first certificate, and the first vehicle transmitting the first certificate to the second vehicle;
   authorizing a second autonomous handoff of the package from the second vehicle to an autonomous receiver at the drop-off location in response to the second vehicle identifying the autonomous receiver to be within the delivery pairing;
   performing a second provenance process as part of the second autonomous handoff, the second provenance process including: the second vehicle digitally signing the first certificate with a second key of the second vehicle to generate a second certificate, and the second vehicle transmitting the second certificate to the autonomous receiver;
   performing a localization process as part of the first autonomous handoff, the localization process including the first vehicle and the second vehicle bidirectionally exchanging positioning signals to guide the second vehicle in autonomously retrieving the package from a package pick-up bay of the first vehicle; and
   performing a notification process following receipt of the package at the autonomous receiver, the notification process including a back-office delivery controller receiving a delivery message from the autonomous receiver, the delivery message including the second certificate and a timestamp marking receipt of the package at the autonomous receiver, wherein the notification process includes the back-office delivery controller transmitting a notification message to a device associated with an originator of the package, the notification message including information indicating successful delivery of the package to the autonomous receiver.

2. The method according to claim 1, wherein:
the localization process includes the first and second vehicles exchanging ultra-wideband (UWB) location pulses between anchors included thereon, with the second vehicle localizing to the package pick-up bay based at least in part on a time-of-flight (TOF) associated with the pulses.

3. The method according to claim 2, further comprising:
performing a prioritization process prior to authorizing the second autonomous handoff, the prioritization process including the first vehicle selecting the second vehicle from a plurality of UAVs operating in proximity thereto.

4. The method according to claim 3, wherein:
the prioritization process includes:
discovering credentials wirelessly transmitted to the first vehicle from the UAVs; and
selecting the second vehicle from one or more of the UAVs transmitting a credential to the first vehicle matching with one of the credentials in the delivery pairing.

5. The method according to claim 4, wherein:
the prioritization process includes:
selecting a third vehicle from one or more of the UAVs transmitting a credential to the first vehicle matching with another delivery pairing associated with another package included within another package pick-up bay of the first vehicle; and
coordinating a flight of the third vehicle to the another package pick-up bay relative to a flight of the second vehicle to the package pick-up bay to avoid the second and third vehicles interfering with each other when retrieving the package and the another package from the first vehicle.

6. The method according to claim 5, further comprising:
performing a security process in response to a fourth vehicle attempting to retrieve the package from the first vehicle, the fourth vehicle lacking a credential matching with one of the credentials in the delivery pairing.

7. A method for electronically securing drone package delivery, comprising:
determining a provenance certificate assigned to a package scheduled for drone delivery;
determining a delivery route for the package;
determining a plurality of vehicles to be used in transporting the package along the delivery route, with at least one of the vehicles being a surface vehicle configured for surface transport of the package and at least one of the vehicles being a drone configured for aerial transporting the package to an autonomous receiver at a drop-off location;
determining credentials assigned to each of the vehicles and the autonomous receiver;
pairing the credentials with the package to generate a delivery pairing, the delivery pairing identifying the credentials of the vehicles authorized to transport the package and the autonomous receiver authorized to receive the package;
authorizing a surface-to-air autonomous handoff of the package from the surface vehicle to the drone in response to the surface vehicle identifying the drone to be within the delivery pairing, the drone operable thereafter for autonomously flying the package to the drop-off location;
authorizing an air-to-surface autonomous handoff of the package from the drone to the autonomous receiver in response to the drone identifying the autonomous receiver to be within the delivery pairing; and
performing a localization process as part of the surface-to-air autonomous handoff and the air-to-surface autonomous handoff, the localization process including:
the surface vehicle and the drone bidirectionally exchanging positioning signals to guide the drone in autonomously retrieving the package from a package pick-up bay of the surface vehicle; and
the drone and the autonomous receiver bidirectionally exchanging positioning signals to guide the drone in autonomously delivering the package to a package drop-off bay of the autonomous receiver.

8. The method according to claim 7, further comprising:
performing a provenance process as part of the surface-to-air autonomous handoff and the air-to-surface autonomous handoff, the provenance process including:
the surface vehicle signing the provenance certificate for transmission to the drone; and
the drone thereafter signing the provenance certificate for transmission to the autonomous receiver.

9. The method according to claim 7, further comprising:
wherein the positioning signals are ultra-wideband (UWB) location pulses emitted to measure time-of-flight (TOF) between anchors included on the surface vehicle, the drone, and the autonomous receiver.

10. The method according to claim 7, further comprising:
the surface vehicle receiving certificates from a plurality of drones operating in proximity thereto; and
the surface vehicle selecting the drone from a one of the plurality of drones transmitting a credential to the surface vehicle matching with one of the credentials in the delivery pairing.

11. The method according to claim 10, further comprising:
the surface vehicle denying delivery of the package to one or more of the drones providing credentials failing to match with one of the credentials in the delivery pairing.

12. A controller configured for electronically securing package delivery, the controller comprising:
a processor; and
a non-transitory computer-readable storage medium having a plurality of instructions stored thereon, wherein the instructions, when executed by the processor of the controller, cause the controller to perform steps comprising:
assigning a provenance certificate to a package scheduled for drone delivery;
determining a plurality of vehicles to be used in transporting the package to an autonomous receiver;
determining credentials assigned to each of the vehicles;
pairing the credentials with the package to generate a delivery pairing, the delivery pairing identifying the credentials of the vehicles authorized to transport the package;
transporting the delivery pairing to each of the vehicles to prevent vehicles having credentials omitted from the delivery pairing from transporting the package;

wherein at least one of the is being a surface vehicle and at least one of the vehicles is a drone configured for transporting the package;

wherein the instructions further cause the controller to perform steps comprising:

authorizing a surface-to-air autonomous handoff of the package from the surface vehicle to the drone in response to the surface vehicle identifying the drone to be within the delivery pairing, the drone operable thereafter for autonomously flying the package to a drop-off location;

authorizing an air-to-surface autonomous handoff of the package from the drone to an autonomous receiver at the drop-off location in response to the drone identifying the autonomous receiver to be within the delivery pairing; and performing a localization process as part of the surface-to-air autonomous handoff and the air-to-surface autonomous handoff, the localization process including:

the surface vehicle and the drone bidirectionally exchanging positioning signals to guide the drone in autonomously retrieving the package from a package pick-up bay of the surface vehicle; and the drone and the autonomous receiver bidirectionally exchanging positioning signals to guide the drone in autonomously delivering the package to a package drop-off bay of the autonomous receiver.

* * * * *